(No Model.)

W. H. RAGAN.
LINE AND TRACE HOLDER.

No. 458,112. Patented Aug. 18, 1891.

WITNESSES:
A. J. Schwartz
J. F. Reily

Wm. H. Ragan,
INVENTOR
BY
W. T. Fitzgerald & Co.,
ATTORNEYS.

UNITED STATES PATENT OFFICE.

WILLIAM HENRY RAGAN, OF MOUNT PISGAH, ARKANSAS.

LINE AND TRACE HOLDER.

SPECIFICATION forming part of Letters Patent No. 458,112, dated August 18, 1891.

Application filed February 5, 1891. Serial No. 380,371. (No model.)

*To all whom it may concern:*

Be it known that I, WILLIAM HENRY RAGAN, a citizen of the United States, residing at Mount Pisgah, in the county of White and State of Arkansas, have invented certain new and useful Improvements in Line and Trace Holders; and I do hereby declare the following to be a full, clear, and exact description of the invention, such as will enable others skilled in the art to which it appertains to make and use the same.

My invention consists in a new and improved attachment for harness, consisting of the combined line and trace holder, which will be hereinafter fully described and claimed.

Figure 1:
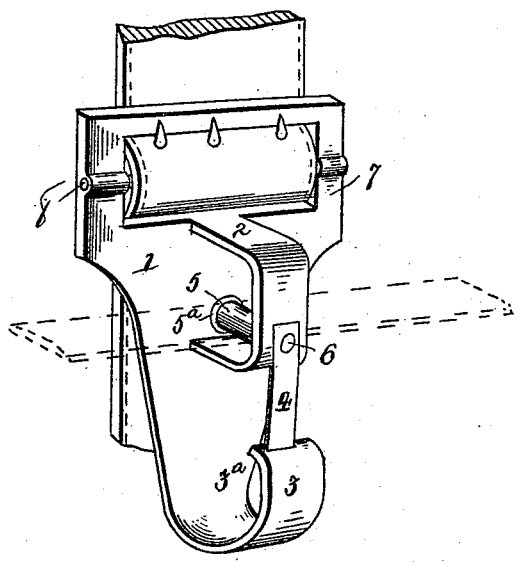
Figure 2:
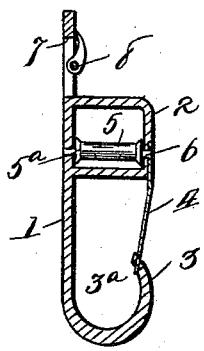
Figure 3:
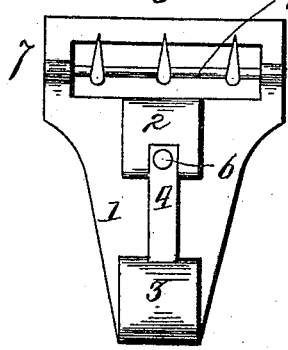

Referring to the accompanying drawings, Figure 1 is a perspective view of my combined line and trace holder. Fig. 2 is a central sectional view of the same. Fig. 3 is a front elevation.

The same numerals of reference indicate corresponding parts in all the figures.

Referring to the several parts by their designating numerals, the body of the holder is cast or formed with the straight back 1, the upper closed loop 2, and the lower open loop 3, the entrance to which is closed by the spring 4. The line runs through the upper loop 2 and runs upon a transverse anti-friction roller 5, which is mounted in the lower part of the loop 2 on the bolt 6. This roller is preferably formed with the small end flanges 5$^a$, which serve to hold the line in place on the roller. This roller, it will be seen, protects the line from wear by greatly reducing the friction. The trace or trace-chain is passed into the lower loop 3 of the holder through the opening 3$^a$ in the outer side of the same, pressing inward the free end of the spring-guard 4, and it will be seen that this spring-guard, while it allows the trace or chain to be readily placed in the holder, will effectually prevent its slipping or working out of the holder.

The holder proper is secured to the back strap of a harness by means of a flat buckle 7, to which it is secured or cast, this buckle being provided with the cross-bar 8, having the usual series of points or projections.

The holder is preferably formed integral—that is to say, in one piece—except the friction-roller, the spring-guard, and the rod which secures the same in position.

From the foregoing description, taken in connection with the accompanying drawings, the construction, operation, and advantages of my invention will be readily understood. It will be seen that my combined line and trace holder is simple and strong in its construction and very convenient and satisfactory in use and operation.

Having thus described my invention, what I claim, and desire to secure by Letters Patent, is—

1. The combined line and trace holder consisting of the body formed with the closed upper loop and the open lower loop adapted to receive, respectively, the line and the trace, and the spring-tongue secured to the upper loop and closing the opening into the lower loop, substantially as set forth.

2. In a combined line and trace holder comprising the flat buckle 7, the body secured to said buckle and formed with the closed upper loop and the open lower loop, the spring-guard 4, and the friction-roller journaled in the lower part of the upper loop, substantially as set forth.

In testimony whereof I affix my signature in presence of two witnesses.

WILLIAM HENRY RAGAN.

Witnesses:
A. R. WILLIAMS,
J. S. VALENTINE.